US006277473B1

(12) United States Patent
McGinn

(10) Patent No.: US 6,277,473 B1
(45) Date of Patent: Aug. 21, 2001

(54) STRUCTURAL MEMBER ASSEMBLY

(76) Inventor: John McGinn, 4 Lakeshore Court, Lakeshore Avenue, North Buderim, QLD 4556 (AU)

( * ) Notice: Subject to any disclaimer, the term of this patent is extended or adjusted under 35 U.S.C. 154(b) by 0 days.

(21) Appl. No.: 09/012,341

(22) Filed: Jan. 23, 1998

(51) Int. Cl.$^7$ .............................. B32B 3/28; B29D 22/00; A01K 87/00
(52) U.S. Cl. ...................... 428/188; 428/36.91; 428/397; 428/36.3; 43/18.1; 43/18.5
(58) Field of Search ...................................... 428/188, 397, 428/36.91, 36.3, 112, 119, 124, 130, 398; 473/319; 43/18.5, 18.1

(56) References Cited

U.S. PATENT DOCUMENTS

| Re. 18,365 | * | 3/1932 | Anderson | 43/18 |
| 592,613 | * | 10/1897 | Kenyon | 43/18 |
| 638,733 | * | 12/1899 | Martin | 43/18 |
| 1,318,421 | * | 10/1919 | Welles | 43/18 |
| 1,748,223 | * | 2/1930 | Herris | 43/18 |
| 1,811,419 | * | 6/1931 | Anderson | 43/18 |
| 1,932,986 | * | 10/1933 | Powell | 43/18 |
| 2,537,488 | * | 1/1951 | Stoner | 43/18 |
| 4,582,758 | * | 4/1986 | Bruce et al. | 428/397 |
| 5,229,187 | * | 7/1993 | McGinn | 428/188 |
| 5,540,013 | * | 7/1996 | Diamond | 52/70 |

\* cited by examiner

Primary Examiner—Donald Loney

(57) ABSTRACT

The present invention is a general structural member assembly. A basic structural unit of the present invention has two adjacent shafts, both further having a cross sectionally triangular shape with a longitudinal side completely or substantially mostly removed to form legs. The leg ends are formed or machined such that they present two outward surfaces generally parallel to the the open face of a first adjacent shaft. The outward surfaces of the leg ends are then positionally fixed, albeit with some flexible movement in some embodiments, to generally have a parallel and longitudinal interface with the longitudinal outside edges of a solid side of a second shaft. Additional shafts may be added in this open side opposed to solid side assembly.

9 Claims, 6 Drawing Sheets

Wrapping / Laminate External Support

STRUCTURAL MEMBER ASSEMBLY

BACKGROUND OF THE INVENTION

This invention relates to structural members.

In a previously filed application, an invention was disclosed relating to rods and shafts which are suitable for use in the construction of tapered and parallel edged fishing rods, golf shafts, yacht masts, sailboard masts and the like.

Fishing rods, golf shafts, yacht masts, sailboard masts, and the like are generally constructed of fibre-resin composites or metal in the form of solid rods or tubes. Hollow composite rods are accepted as being superior in performance to solid composite rods in light weight uses but they are delicate and easily damaged. Solid metal rods and metal tubes are generally inferior in flexural characteristics to the composite rods. It will be apparent to the skilled person that the teaching of rod or shaft construction in the above arts may be effectively applied to other heavier, industrial or civil engineering uses as well.

Tapered, tubular composite rods require expensive, accurately ground metal mandrels to produce the taper necessary for the desired performance and there are considerable difficulties in manufacturing with uniform wall thickness. An attempt to overcome to some extent the problems associated with tubular rod manufacture from composite materials is the subject of U.S. Pat. Nos. 4,582,758 and 5,229,187 (referred to herein respectively as Bruce & Walker and McGinn), the enabling teaching of which are incorporated herein.

Both patents relate to the provision of rods of polygonal cross-section formed by a plurality of elements of certain geometrical cross-section. Bruce & Walker describes that each of the elements has a base part of a fibre reinforced plastic material and an apex of part of a rigid plastic material foam.

McGinn, on the other hand, adopted a method of using T-sections made from fibre reinforced plastic material. The method by which the joints of the top ends of T-sections in McGinn are joined is shown in FIG. 5 of that patent. It is seen that the top ends of the T-sections must be molded or machined to a relatively small tolerance to accommodate matching of the several faces of the T-sections to each other. Both these rods, while they solve wall thickness variation problems and obviate the need for expensive mandrels for forming are difficult to make in the required thickness.

Bruce & Walker experience difficulties in the required stiffness for heavy load application such as are encountered in deep sea fishing and similar application without resorting to excessive composite wall thickness. The technology applied by McGinn addresses the stiffness required in heavy load application, but the mere nature of this technology reduces the ability to make the rods flexible for fly rod application in the various line weights required. Neither invention has adequately addressed the problem of torque encountered in small structures such as golf shafts.

The problem is severe in the case of Bruce & Walker. The McGinn technology has gone some way to addressing this problem with sufficient torque being removed from fishing rods to make them user acceptable. However, the problem of torque is highlighted when both products are used as golf shafts. Any torque in the shafts alters the angle of the golf club head when it comes in contact with the ball, which is unacceptable to the playing golfing public.

It is therefore one object of the present invention to provide a rod, shaft, etc., which obviates or at least minimizes the aforementioned disadvantages of conventional rods and those of Bruce & Walker and McGinn.

SUMMARY OF THE INVENTION

The present invention is a general structural member assembly. Two embodiments of a a basic structural unit of the present invention have two adjacent shafts, both further having a cross sectionally triangular shape with a longitudinal side completely or substantially mostly removed. The "open" side, i.e., the side completely or substantially mostly removed, in cross section presents two "leg" ends, i.e., the ends distal to the vertex of the longitudinal sides that at structurally intact and maintain the vertex of the two solid sides and such that the legs are approximately equal in length. The leg ends are formed or machined such that they present two outward surfaces generally parallel to the the open face of a first adjacent shaft. The outward surfaces of the leg ends are then positionally fixed, albeit with some flexible movement in some embodiments, to generally have a parallel and longitudinal interface with the longitudinal outside edges of a solid side of a second shaft. Additional shafts may be added in this open side opposed to solid side basic assembly unit to form a single joined polygonal shaft assembly where all of the open sides are enclosed with a solid side, the additions proceeding in a circular fashion to form a polygonal cross section of exceptional strength and torsional resistance. Where a more extensive structure is desired, additional whole or partial sections of these joined polygonal shafts may be joined along one or more of their solid faces longitudinally along the solid faces of a first joined polygonal shaft, or portion thereof, at least preserving one basic structural unit of an open side positionally fixed to a closed side.

In the first of the two above embodiments, the open side completely lacks any portion of the longitudinal face of the triangular cross section of the adjacent shafts. The second of the two above embodiments comprises two short opposing extensions from the ends of the solid sides without such in the first embodiment, such that a short portion of the open side is formed along those legs to improve flexing strength.

In a third embodiment of a basic structural unit, two adjacent shafts also have open sides, a first adjacent shaft having solid sides and legs similar to those of the first embodiment except that an outside facing solid side has a cross section first length that is longer than that of the joined polygon enclosed solid side by about the thickness of a solid side. A second adjacent shaft also has an outside facing solid side of about the same cross section length and leg surface as that of the first adjacent leg. The joined polygon enclosed solid side of the second adjacent shaft also has the same length as its outside facing solid side, although it is further extended from its leg end in a direction such that the leg surface of the shortened leg of the first adjacent shaft presses in a force transmitting connection on an inside surface of the extension of the second adjacent shaft in an assembled arrangement as a basic structural unit. The assembled and combined cross section length of the shortened joined polygon enclosed solid side of the first adjacent shaft with the thickness of the extension of the joined polygon enclosed solid side of the second adjacent shaft then presents an outside surface of the extension as a leg surface effective with the leg surface of the outside facing solid side of the first adjacent shaft to then fixedly oppose the outside surface of a joined polygon enclosed solid side of another adjacent shaft such as that of the second adjacent shaft.

It is a further improvement of the present three basic structural units to provide single layer or laminar binding around the outside facing solid sides of a joined polygonal shaft assembly without any further securement, gluing, welding, bolting, soldering or the like between the adjacent shafts such that the adjacent shafts remain in positions sufficiently fixed to effect the support required of their application. This wrapped, un-secured embodiment is useful when sliding flexure of the adjacent shafts are desired, especially when a type of bending or twisting force is not so great as to break down the surrounding support.

It is a further improvement of the present three basic structural units to provide a single bonded axial connection to the central axis of the joined polygonal shafts, whereby the bonding may be accomplished with glues, expoxies, weld connections, solder or other methodologies (such as bolting and piercing/riveting methods) appropriate for securement of the central axis formed by the zone of leg ends of the joined polygon enclosed solid sides. Such joined polyonal shafts may then be bundled and secured together or with other longitudinal supports about their periphery such as described in the previous paragraph.

It is a further improvement of the present three basic structural units to provide bonding as described in the previous paragraph is provided only for the interface between the leg surface of the outside facing solid side and the abutting vertex zone of the joined polygon enclosed solid side of the adjacent shaft. A joined polygon shaft of this embodiment thus comprises an outer edge of longitudinally bonded adjacent shafts while leaving free for sliding movement the zone of leg ends of the joined polygon enclosed solid sides during flexing or torsional movement.

It is a further improvement of the present invention to combine the wrapping securement, central axis or outside facing seam bonding in combination with each other to obtain specific performance characterisitics of flexing and torsional response. For example, the combination of a wrapping securement and the central axis bonding permits some slidable flexion in the interface between the leg surface of the outside facing solid side and the abutting vertex zone of the joined polygon enclosed solid side of the adjacent shaft while stiffening the overall structure with a non-bonding sleeve under the stiffening wrapping securement.

It is yet another embodiment of the present invention to form joined polygonal shafts with at least three or more sides. Any of the basic structural units are easily adapted to form joined polygonal shafts of any number of cross section outside solid sides so long as that number is three or more.

Additional inventive supports for the basic structural units comprise inserts into or fills for the void between the outer face of a polygon enclosed solid side of a first adjacent shaft and the inside faces of a the outside facing solid side and a polygon enclosed solid side of a second adjacent shaft, forming a longitudinal void with a roughly triangular shape. Longitudinal support inserts or fills into this void may have a cross section shape of a plane, trangle, circle (or oblate), separate solid rods, solid fill (urethane foam, epoxy, solder or metal), or fusible structurally supportive material. Appropriately smaller adjacent shafts of the present invention are also adaptable to be inserted alone or in a nesting relationship as longitudinal support for insertion into such a longitudinal void. Another class of inventive supports comprise planar inserts longitudinally interposed between and along the outer face of the joined polygon enclosed solid side of a first adjacent shaft and the leg surfaces of a second adjacent shaft. It has been found in prototype models of this planar insert embodiment that very thin, even flexible plastic material may comprise the basic structural unit while providing a planar insert bonded to the outer face of a joined polygon enclosed solid side that creates a joined polygon shaft of superior strength.

The basic structural units of the present invention may be used in such a wide number of applications that the types of additional supports described in the preceding paragraph may be applied separately or in combination along the length of any single longitudinal void. For example, in an antenna, ship mast or hull, or building joist where variable strength, flexibility and resistance to torsion may be desirable, a nested set of smaller adjacent shafts in one section of the longitudinal void may be easily reduced to an identical set of such supports less the innermost nested adjacent support shaft.

DESCRIPTION OF THE INVENTION

Figure 1:
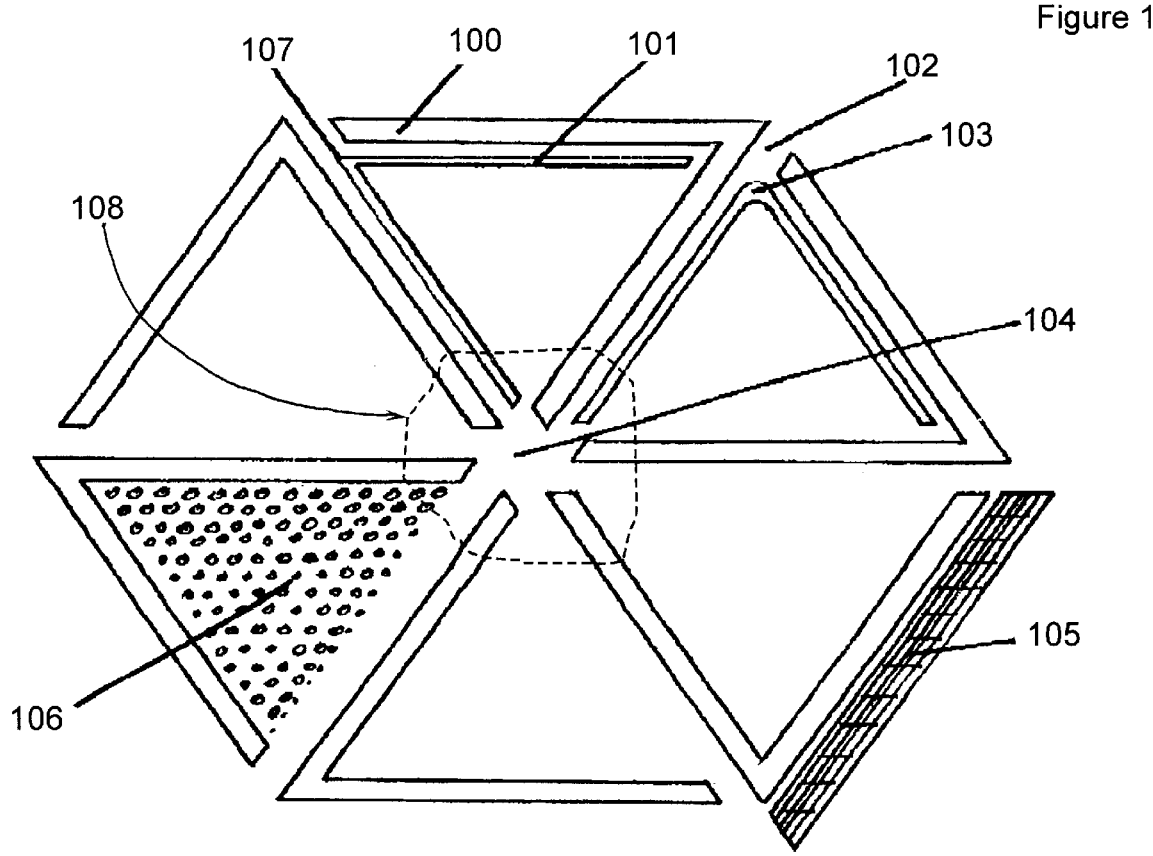
FIG. 1 is a somewhat exploded cross-sectional view of the rod of the present invention, wherefore V sections and reinforcing V sections are shown in unsecured relationship.

According to the present invention, there is provided a rod comprising a plurality of elongated V section elements wherein the open end of the V section element is joined to one leg of the adjacent V section elements. The other leg of the V section element forms the outer surface of the polygonal shape. The extremities of the inner leg of the V section element extend in a direction towards a common axis.

Practical consideration in rod construction will generally limit the number of V section elements to 12 and most preferably to 6. Hexagonal structures are the most preferred.

The elongate V section elements may have parallel or tapered edges depending on the particular end use to which the rod, shaft etc. is to be put. The V section elements may be fabricated from a wide range of materials, the preferred materials being those which provide maximum longitudinal stiffness and have low weight. Particularly suitable materials are fibre reinforced plastics materials such glass, carbon, polyimide and boron fibre in admixture with polyester, epoxy, phenol and thermoplastic resins. Metals such as aluminum, brass, titanium and fibre reinforced metals, and metal composites such as fibre reinforced aluminum and silicon carbide filled magnesium, are also useful are anisotropic polymers such as liquid crystal polymers.

In constructing the rod, it is not necessary for all the elongated V section elements to be fabricated from the same material and, in fact, it can be advantageous in certain circumstances to use different materials having different mechanical properties. Thus, in the case where the rod is to be placed under load in only one bending direction, elongate V section elements of high compressive strength may be employed on the inside of the curve and elements of high tensile strength may be employed on the outside of the curve. This will minimize the weight of the rod shaft etc. and the quantity of materials required to produce a particular stiffness or action.

Additional strength characteristics may be provided by filling one or more of the cavities within the rod with one or more suitable fillers. Preferred fillers include expanded structural foams such as polyurethanes, polyvinylchloride, polyimide, polystyrenes and composites such as resinous mixtures of glass bubbles and microspheres, silicates, carbonates, chopped strand fibres and fibre whiskers. The filler may be placed into the cavities after the V section elements have been joined together or into the space between the legs of the V section element prior to joining.

To form a polygonal structure of 6 sides, a combination of 6 accurately machined composite V section elements and extending the full length of the element: The V section elements are glued together lengthwise with the open end of the V section element glued to one of the legs of the adjacent V section element with the apex of the V section element facing outwards.

An outer fibre/resin composite skin is then added by tape winding or filament winding or composite cloth wrapping around the tapered rod formed from the V section elements to give a structure similar to that above. Further strengthening of the hexagonal structure can be achieved by gluing a similar angled shaped object into the triangular hollows having the apex of this structure covering the outermost joint of the V section element. One leg of the structure being glued to the surface of the inner leg of the adjacent V section element. The other of the structure is glued to the inner surface of the V section element that forms the outer surface. These V shaped reinforcing structures can be of composite material, or aluminum, brass, steel or expanded structural foam etc.

The jointing together of the elongate V section elements may be achieved by the use of an adhesive which is compatible with the materials of the element; for instance, epoxy resin, or, in the case of some thermoplastics by the use of ultrasonic welding.

Figure 2:
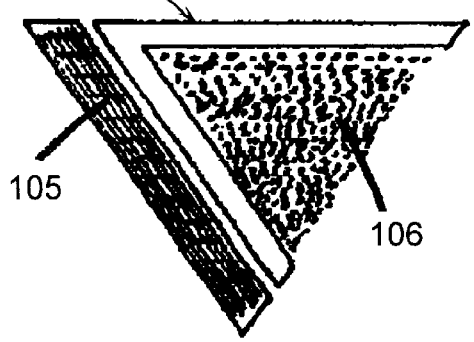
FIG. 2 is a closer view of the V trough point of a V section, wherein the V section is filled with strengthening filler, as described below, and an exterior surface is shown with supporting laminates to be arranged in wrapping support about the assembled V sections.
Figure 3:
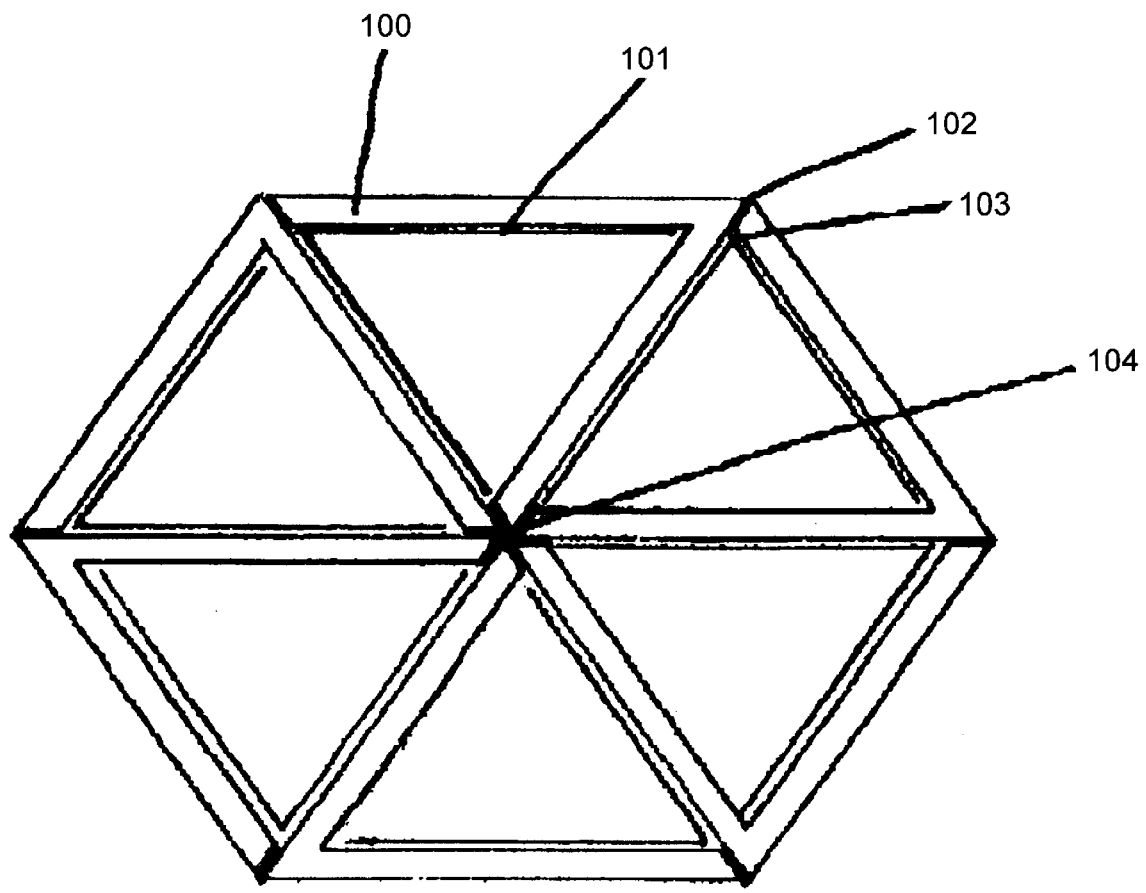
FIG. 3 is the assembled and secured cross-sectional view of the V sections and reinforcing V-sections shown in FIG. 1.

The present invention is now described with respect to the above Figures. In FIGS. 1, 2 and 3, accurately machined elongate V section element 100 may be fabricated from a wide range of materials such as fibre reinforced plastics which include glass, carbon, polyimide and boron fibre in admixture with polyester, epoxy, phenol or thermoplastic resins.

In FIGS. 1 and 3 are shown accurately machined elongate V section reinforcing element 101 fabricated from composite material or metal, such as brass, aluminum, steel, titanium and metal composites, bonded to inside of outer leg of elongate V section element and the to the outer surface of the inner leg of the adjacent V section element, so that the reinforcing V section element covers the glued joint 102. The radius 103 of reinforced V section structure 101 can be sharp or rounded depending on design and performance of product. The inner leg ends 104 of the elongate V sections 100 are intended to be glued or likewise secured together generally in axial securing zone 108. FIG. 3 shows such securing. Extra laminates 105 of compatible material added to the outer surface of the V section element 100 depending on the requirements of the product. Cavity fill 106 such as expanded structural foam, polyurethanes, polyvinylchloride, polyimide, polystyrenes and composites such as resinous mixtures of glass bubbles and microspheres, silicates, chopped stressed fibres and fibre whiskers.

Tape winding or filament winding around structure not shown in full detail although the skilled person is informed by the disclosure herein of its advantages and application.

Figure 4:
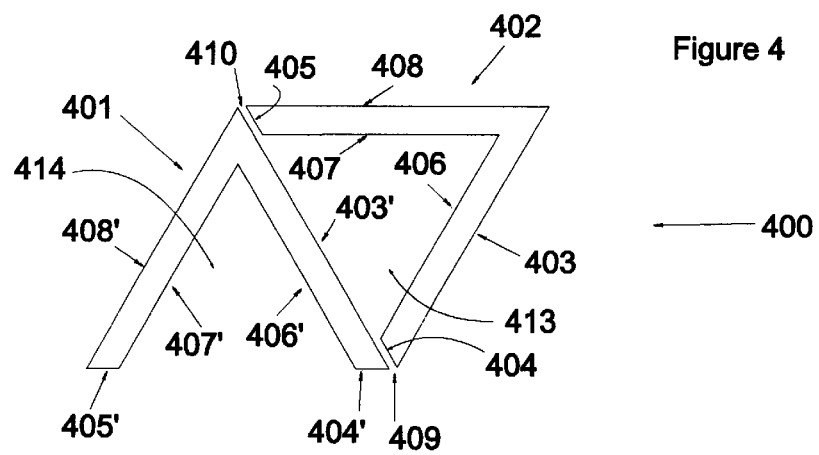
FIG. 4 is a first embodiment of the basic structural unit of the present invention.

The present invention is now discussed with reference to the figures, whose reference numbers indicate substantially similar aspects of the figure when the same reference number is used in separate figures. With reference to FIG. 4, a first embodiment of the basic structural unit 400 is shown in cross section comprising a first adjacent shaft 401 and second adjacent shaft 402. Shaft 401 comprises:
  inner face 407' of an outside facing solid side,
  outer face 408' of an outside facing solid side,
  inner face 406' of a joined polygon enclosed solid side,
  outer face 403' of a joined polygon enclosed solid side,
  leg surface 404' of a joined polygon enclosed solid side,
  leg surface 405' of a an outside facing solid side, and
  longitudinal void 414.
Shaft 402 comprises:
  inner face 407 of an outside facing solid side,
  outer face 408 of an outside facing solid side,
  inner face 406 of a joined polygon enclosed solid side,
  outer face 403 of a joined polygon enclosed solid side,
  leg surface 404 of a joined polygon enclosed solid side,
  leg surface 405 of an outside facing solid side, and
  longitudinal void 413.

Leg surfaces 404 and 405 are shown to be adapted to be roughly parallel with an outer face 403', thereby having between them spaces 409 and 410 respectively. Spaces 409 and 410 are optionally separately bondingly closed as described in one of the several manners described in the Summary of the Invention. The leg surfaces of this first embodiment are preferably formed or machined to achieve an edge or face appropriate for force transmitting contact the outer face 403' of the joined polygon enclosed solid side. This force transmitting abutment or connection is critical to the present invention.

Figure 5:
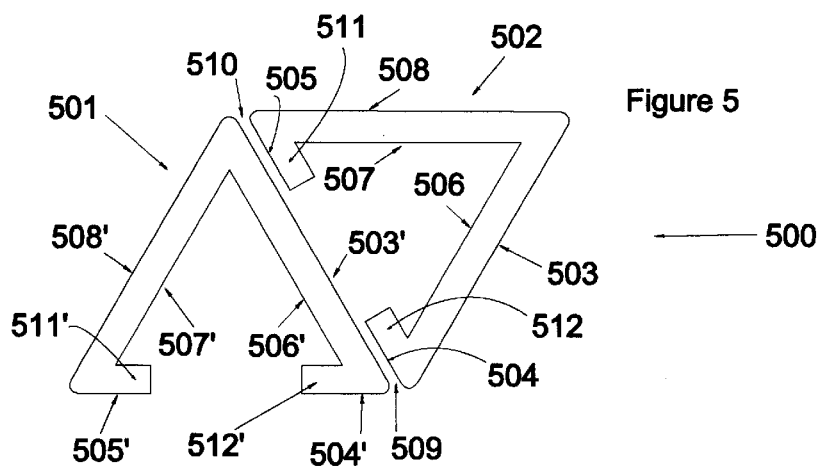
FIG. 5 is a second embodiment of the basic structural unit of the present invention.

With reference to FIG. 5, a second embodiment of the basic structural unit 500 is shown in cross section comprising a first adjacent shaft 501 and second adjacent shaft 502. Shaft 501 comprises:

inner face 507' of an outside facing solid side,
outer face 508' of an outside facing solid side,
inner face 506' of a joined polygon enclosed solid side,
outer face 503' of a joined polygon enclosed solid side,
leg surface 504' of a joined polygon enclosed solid side,
leg surface 505' of an outside facing solid side,
leg extension 511' of an outside facing solid side, and
leg extension 512' of a joined polygon enclosed solid side.

Shaft 502 comprises:

inner face 507 of an outside facing solid side,
outer face 508 of an outside facing solid side,
inner face 506 of a joined polygon enclosed solid side,
outer face 503 of a joined polygon enclosed solid side,
leg surface 504 of a joined polygon enclosed solid side,
leg surface 505 of an outside facing solid side,
leg extension 511 of an outside facing solid side, and
leg extension 512 of a joined polygon enclosed solid side.

Leg surfaces 504 and 505 are shown to be adapted to be roughly parallel with an outer face 503', thereby having between them spaces 509 and 510 respectively. Spaces 509 and 510 are optionally separately bondingly closed as described in one of the several manners described in the Summary of the Invention. The leg surfaces of this second embodiment are preferably formed or machined to achieve an edge or face appropriate for force transmitting contact the outer face 503' of the joined polygon enclosed solid side by inward extension from the ends of an outside facing solid side and a joined polygon enclosed solid side. The leg extensions provide additional resistance to bending and twisting without obtaining the additional stiffness of a fully triangular shaft.

Figure 6:
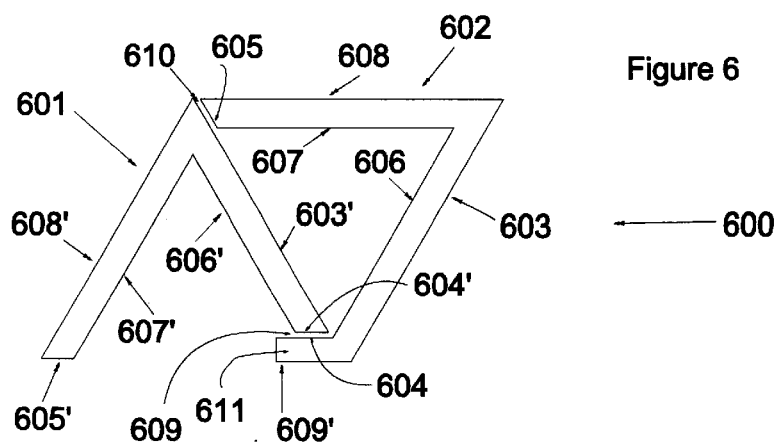
FIG. 6 is a third embodiment of the basic structural unit of the present invention.

With reference to FIG. 6, a third embodiment of the basic structural unit 600 is shown in cross section comprising a first adjacent shaft 601 and second adjacent shaft 602. Shaft 601 comprises:

inner face 607' of an outside facing solid side,
outer face 608' of an outside facing solid side,
inner face 606' of a joined polygon enclosed solid side,
outer face 603' of a joined polygon enclosed solid side,
leg surface 604' of a joined polygon enclosed solid side, and
leg surface 605' of an outside facing solid side,
leg extension 611' of an outside facing solid side, and
leg extension 612' of a joined polygon enclosed solid side.

Shaft 602 comprises:

inner face 607 of an outside facing solid side,
outer face 608 of an outside facing solid side,
inner face 606 of a joined polygon enclosed solid side,
outer face 603 of a joined polygon enclosed solid side,
leg surface 604 of an inside face of leg extension 611,
leg surface 605 of an outside facing solid side,
leg surface 609' of leg extension 611, and
leg extension 611 of a joined polygon enclosed solid side.

Leg surface 605 is shown to be adapted to be roughly parallel with an outer face 503', thereby having between them space 610. Leg surface 604 is shown to be adapted to be roughly parallel with an leg surface 604', thereby having between them space 609. Shaft 601 has a joined polygon encloses solid side shorter than its outside facing solid side by about the thickness of leg extension 611. Spaces 609 and 610 are optionally separately bondingly closed as described in one of the several manners described in the Summary of the Invention. The presentation of leg surface 609' has a parallel form the force transmitting equivalent of leg surface 404' of FIG. 1.

It is clear from this disclosure that the bending and twisting forces on the basic structural unit of this third embodiment will be distributed substantially differently than those of the first embodiment. In a twisting motion, of the first embodiment spaces 409 or 410, one space will tend to compress and the other will tend to separate. With the third embodiment in a twisting motion, of the third embodiment spaces 609 or 610, when space 610 tends to compress, space 611 will also tend to compress. Alternately, when space 609 tends to separate, space 609 will tend to remain about the same with the abutment of the shorter solid side end against the vertex of the adjacent shaft solid side and leg extension.

With the above disclosure, it will apparent that the embodiments of the basic structural units of the present invention may be advantageously abutted against each other to obtain a larger variety of flexural characteristics. For example, outer face 403 of FIG. 1 may be joined against leg surfaces 605' and 609' of FIG. 6 to continue the circular build-up of the basic structural units into a joined polygonal shaft. FIGS. 7–10 show just such circular build-up assemblies for the three embodiments of the present invention.

Figure 7:
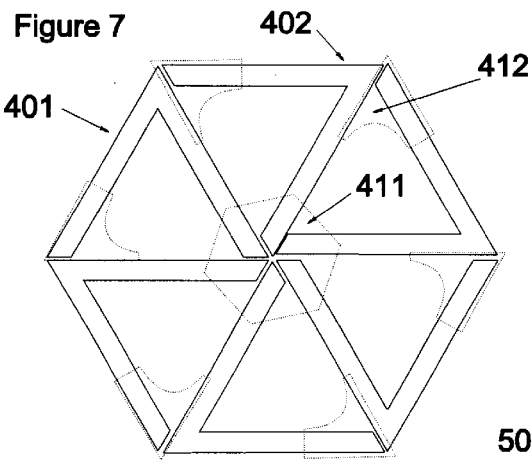
FIG. 7 is a joined polygonal shaft of the first embodiment of the basic structural unit of the present invention with a hexagonal circumferential shape.

FIG. 7 shows the shafts 401 and 402 of a unit 400 duplicated three times and continued in a circular build-up method to provide a single joined polygon shaft. Central axis bonding zone 411 shows a preferable zone in which to provide one of the methods of bonding together the free ends of the joined polygon enclosed solid sides. Outside seam bonding zone 412 shows a preferable zone in which to provide one of the methods of bonding together the leg surface of the outside facing solid side and the abutting vertex zone of the joined polygon enclosed solid side of the adjacent shaft.

Figure 8:
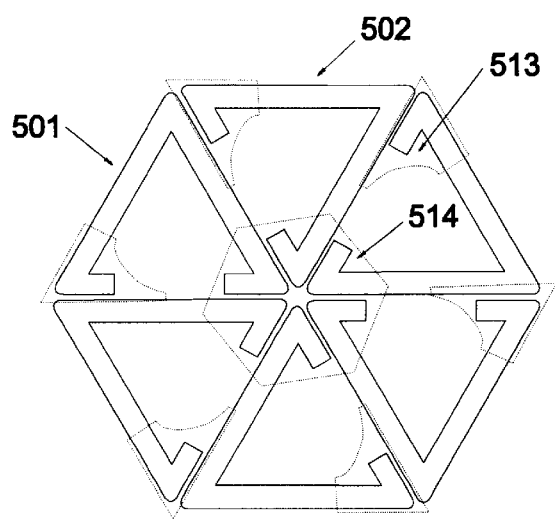
FIG. 8 is a joined polygonal shaft of the second embodiment of the basic structural unit of the present invention.

FIG. 8 shows the shafts 501 and 502 of a unit 500 duplicated three times and continued in a circular build-up method to provide a single joined polygon shaft. Central axis bonding zone 514 shows a preferable zone in which to provide one of the methods of bonding together the free ends of the joined polygon enclosed solid sides. Outside seam bonding zone 513 shows a preferable zone in which to provide one of the methods of bonding together the leg surface of the outside facing solid side and the abutting vertex zone of the joined polygon enclosed solid side of the adjacent shaft. It is seen in the figures that the preferred second embodiment comprises filleting of at least the edges of the outer faces of the adjacent shafts. Where heavier materials, such as metals, alloys and reaction settable or heat formable sheets of polymers are used or where machining is preferably to be avoided on the leg surfaces, the forming or bending processes preferably leave filleted edges to improve the ease of fabrication and bonding. The outside face seams between the adjacent shafts present an area to which welded connections are more easily made. Zone 514 edge filleting creates a central void into which may be forced adhesive bonding means with reaction or heat setting action.

Figure 9:
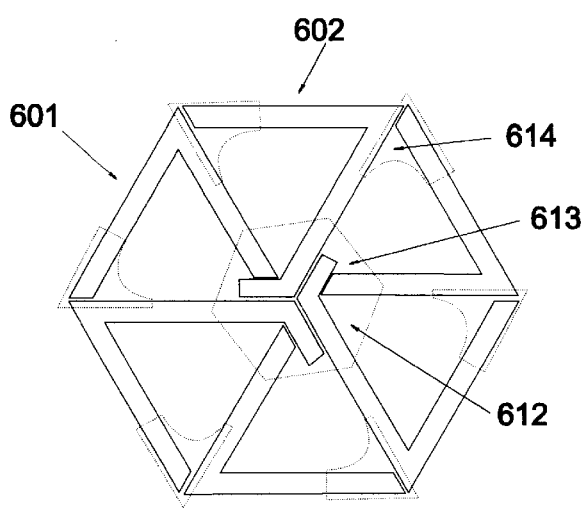
FIG. 9 is a joined polygonal shaft of the third embodiment of the basic structural unit of the present invention.

FIG. 9 shows the shafts 601 and 602 of a unit 600 duplicated three times and continued in a circular build-up method to provide a single joined polygon shaft. Central axis bonding zones 612 and 613 show a preferable zone in which to provide one of the methods of bonding together the free ends of the joined polygon enclosed solid sides. Outside seam bonding zone 614 shows a preferable zone in which to provide one of the methods of bonding together the leg surface of the outside facing solid side and the abutting vertex zone of the joined polygon enclosed solid side of the adjacent shaft.

Figure 10:
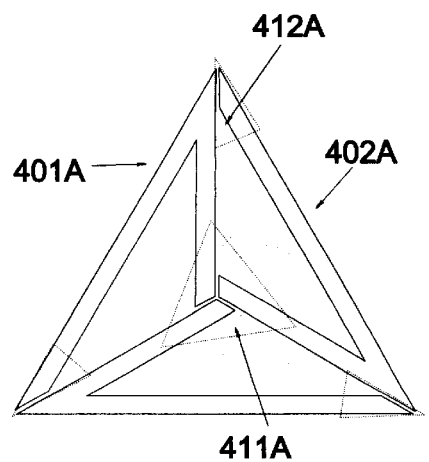
FIG. 10 is a joined polygonal shaft of the first embodiment of the basic structural unit of the present invention with a triangular circumferential shape.

FIG. 10 is an alternate embodiment of this first embodiment with a joined polygonal shaft comprising adjacent shafts 401A and 402A. Central axis bonding zone 411A shows a preferable zone in which to provide one of the methods of bonding together the free ends of the joined polygon enclosed solid sides. Outside seam bonding zone 412A shows a preferable zone in which to provide one of the methods of bonding together the leg surface of the outside facing solid side and the abutting vertex zone of the joined polygon enclosed solid side of the adjacent shaft.

It will be seen that joined polygonal shafts, as opposed to basic structural units, experience compression of, for example, space 410 shown in FIG. 1, regardless of the rotation of twisting force. In some embodiments, It is preferable to provide a more elastic and flexible bonding means for the central axis bonding zones than the outside seam bonding zones so that during twisting motion the free ends of the joined polygon enclosed sides may radially slightly expand without rupturing the bonding means while the bonding on the outside seam bonding zones is simple compressed.

Figure 11:
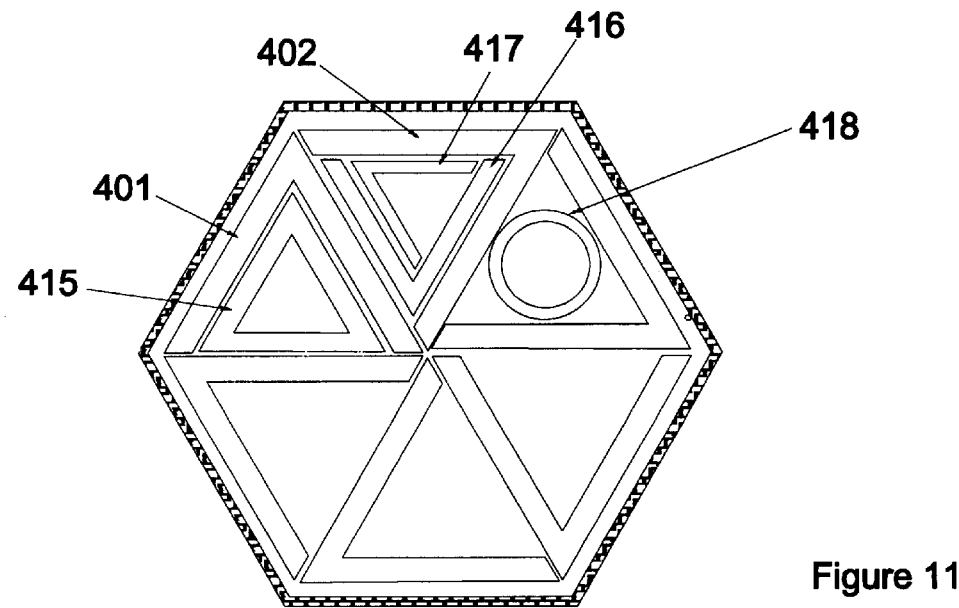
FIG. 11 is a joined polygonal shaft of the first embodiment of the basic structural unit of the present invention with a hexagonal circumferential shape and further showing longitudinal insert supports for the longitudinal void.
Figure 12:
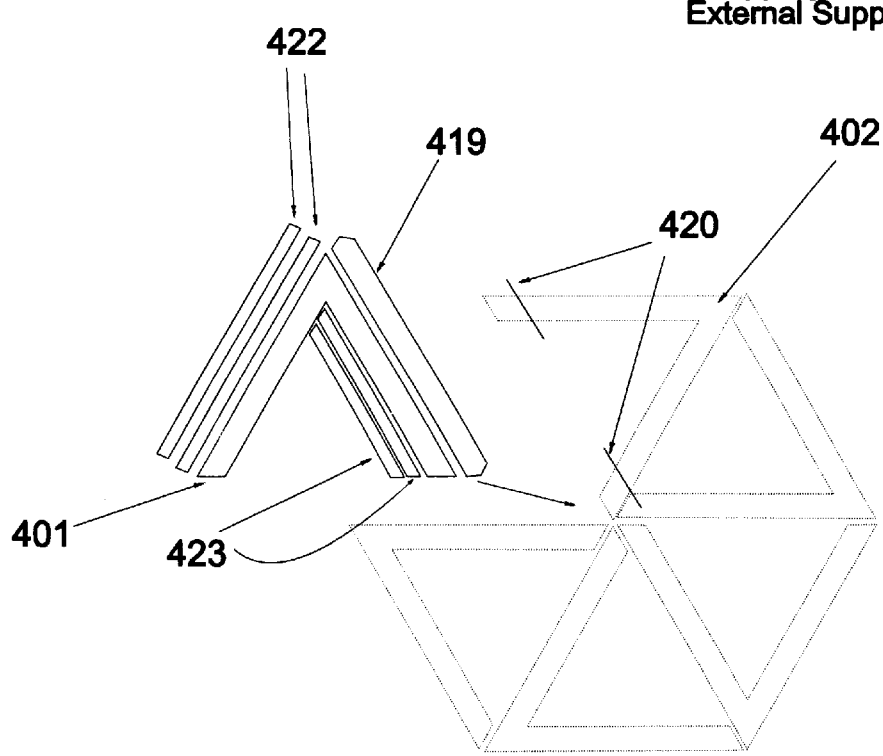
FIG. 12 is a joined polygonal shaft of the first embodiment of the basic structural unit of the present invention with a hexagonal circumferential shape, whereby an adjacent shaft is withdrawn to illustrate the positioning of planar longitudinal supports that may be effectively applied about the inner and outer faces of an adjacent shaft.

In FIG. 12 are shown some of the several types of support means insertable into the longitudinal voids, such as voids 413 and 414 of the basic structural unit. Triangular support 415 and circular support 418 are shown in external side contact with the inside faces of a first adjacent shaft and the outside face of the joined polygon enclosed solid side. First and second nested adjacent shafts 416 and 417 are shown nested within the inside faces of the adjacent shafts of the first embodiment. Shaft 416 is shown and preferably has a solid side fully contact and engage at least an inside face of a first adjacent shaft and the outside face of the joined polygon enclosed solid side of a second adjacent shaft. Shaft 417 is preferably nested such that a solid side engages and fully contacts the remaining open inside face of the first adjacent shaft. The potential of additional nesting of smaller shafts of the types shown in this FIG. 11 will be apparent with this description.

FIG. 12 shows three embodiments of planar supports to an adjacent shaft of the first embodiment of the present invention. Inter-adjacent shaft planar insert 419 is adapted to be held fixed in spaces 409 and 410, as those spaces are shown in FIG. 1, thus requiring a shortening 420 of the solid sides of adjacent shaft 402 to accommodate the insert thickness. Longitudinal void planar inserts 423 preferably abut just below the vertex on the inside face of an outside facing solid side of a first adjacent shaft and extend to abut at the other edge of the insert against the outer face of a joined polygon enclosed solid side of a second adjacent shaft immediately adjacent to the inside edge of the leg surface of the joined polygon enclosed solid side of the first adjacent shaft. An insert 423 extends the effective thickness of a joined polygon enclosed solid side with respect to force transmission from one adjacent shaft to another. External planar supports 422 preferably lie just above the outer face of the outside facing solid side of an adjacent shaft. Supports 422 provide greatest additional resistance to bending against bending in the direction parallel to the face of supports 422.

Figure 13:
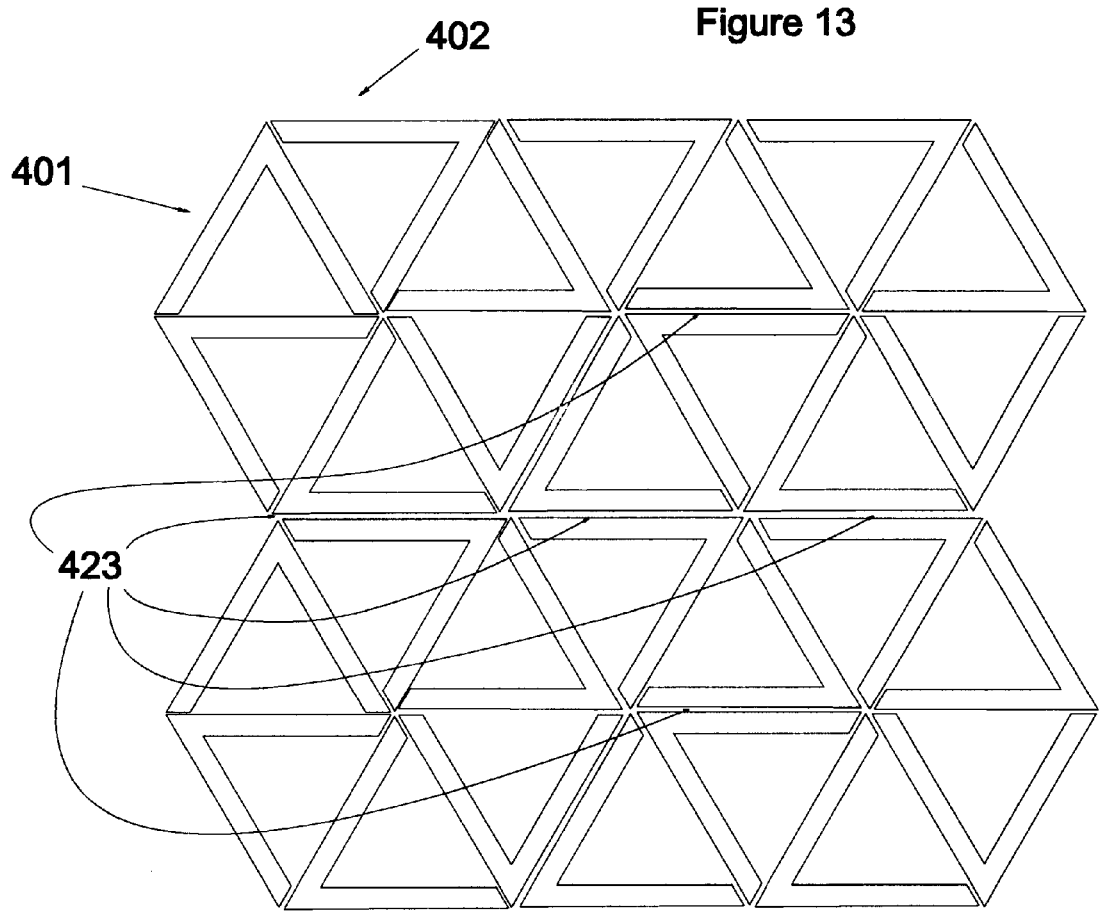
FIG. 13 is a set of joined polgonal shafts of the first embodiment of the basic structural unit of the present invention with a hexagonal circumferential shape forming an enlarged structural member.

Basic structural unit 400 with shafts 401 and 402 is shown multiplied in an enlarged structure in FIG. 13. Space 424 indicate spaces in which the outside faces of solid sides longitudinally must abut with a minimum frequency to increase the size of several assembled basic structural units above the cross section size of a joined polygonal shaft, which has no such abutments. The wide distribution of compression, bending and twisting forces into such a structure provides a strong and lightweight structure.

Figure 14:
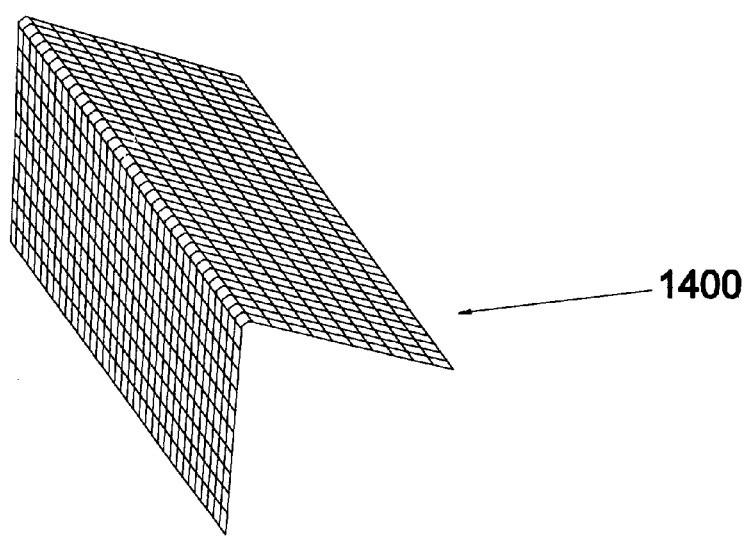
FIG. 14 is an upper front view of a weld mesh formed as the first embodiment of the present invention.

The composition of the solid sides and insert means is limited only to those materials, alloys, composites and the like with sufficient longitudinal strength such that the skilled person would obtain with the above description effective resistance to bending, lateral compression and twisting within the temperature range required for effective operation of a device incorporating the basic structural unit of the present invention. It is another embodiment of the present invention that the composition of the solid sides and/or insert means comprise a high tensile strength weld mesh, effective for fabricating structures according to the present invention with a length of up to several hundred feet. FIG. 14 shows a first embodiment weld mesh 1400 whose resulting longitudinal void may appropriately be filled with structural carbon foam, and whose free ends may be extended in a manner to achieve adjacent shaft cross section shapes of the second and third embodiments.

It will be understood that the solid sides of the present invention are effectively so fabricated. Such adaptations as longitudinal, lateral or slanted slots, perforations, access openings and the like may be provided in the longitudinal surface of the solid surfaces of the present invention, albeit only to the extent that a desired flexural, compression or torsional characteristic is not substantively impaired by such piercing of the solid sides.

The above design options will sometimes present the skilled designer with considerable and wide ranges from which to choose appropriate apparatus and method modifications for the above examples. However, the objects of the present invention will still be obtained by that skilled designer applying such design options in an appropriate manner.

I claim:

1. A structural member assembly comprising:
   (a) two or more longitudinally adjacent shafts, each with an outside facing plate having an inner and outer face, an edge of the outside facing plate forming a first vertex with an enclosed plate having an inner and outer face, whereby opposite edges of each plate are parallel to the first vertex such that the two plates form a substantially triangular cross section with the opposite edges of the plates defining a third plate space therebetween;
   (b) each adjacent shaft further having a leg surface with an outer face extening from the opposite edge of each plate to form two second vertices such that the leg surface extends only partly into the third plate space and do not join with the leg surface of an adjacent shaft at any point;
   (c) a basic structural unit comprising a first and a second adjacent shaft whereby the second adjacent shaft is secured in a position such that the outer face of the leg surface extending from the second vertex with the opposite edge of its outside facing plate abuts the outer face of the enclosed plate of the first adjacent shaft near its first vertex, thereby defining a first interface, and the other leg surface of the second adjacent shaft abuts the outer face of the enclosed plate of the first adjacent shaft side near its opposite edge of its enclosed plate, thereby defining a second interface.

2. The assembly of claim 1 wherein an additional adjacent shaft or shafts are provided a secured position such that each adjacent shaft is secured in a position such that at least one additional basic structural unit is formed, whereby the cross section of the assembly of adjacent shafts forms a polygon of its outer edges of three or more sides.

3. The assembly of claim 2 whereby the longitudinal zones about the first interfaces comprises separate outside seam bonding zones wherein is provided bonding means.

4. The assembly of claim 2 whereby the longitudinal zone of the second interfaces comprises a central axis bonding zone wherein is provided bonding means.

5. The assembly of claim 2 wherein a wrapping means surrounds a circumference of the polygon.

6. The assembly of claim 2 wherein an insert means provide longitudinal support for the assembly.

7. The assembly of claim 6 wherein insert means comprise V-shaped, triangular, circular or planar shafts or reaction or heat bondable fill adapted to abut at least two cross section surfaces of a longitudinal void of the basic structural unit.

8. The assembly of claim 6 wherein insert means comprise planar shafts adapted to be interposed in the first and second interfaces.

9. The assembly of claim 1 wherein multiple basic structural units are formed into an enlarged structure by longitudinal fixation of one basic structural unit to another.

* * * * *